Patented Nov. 18, 1947

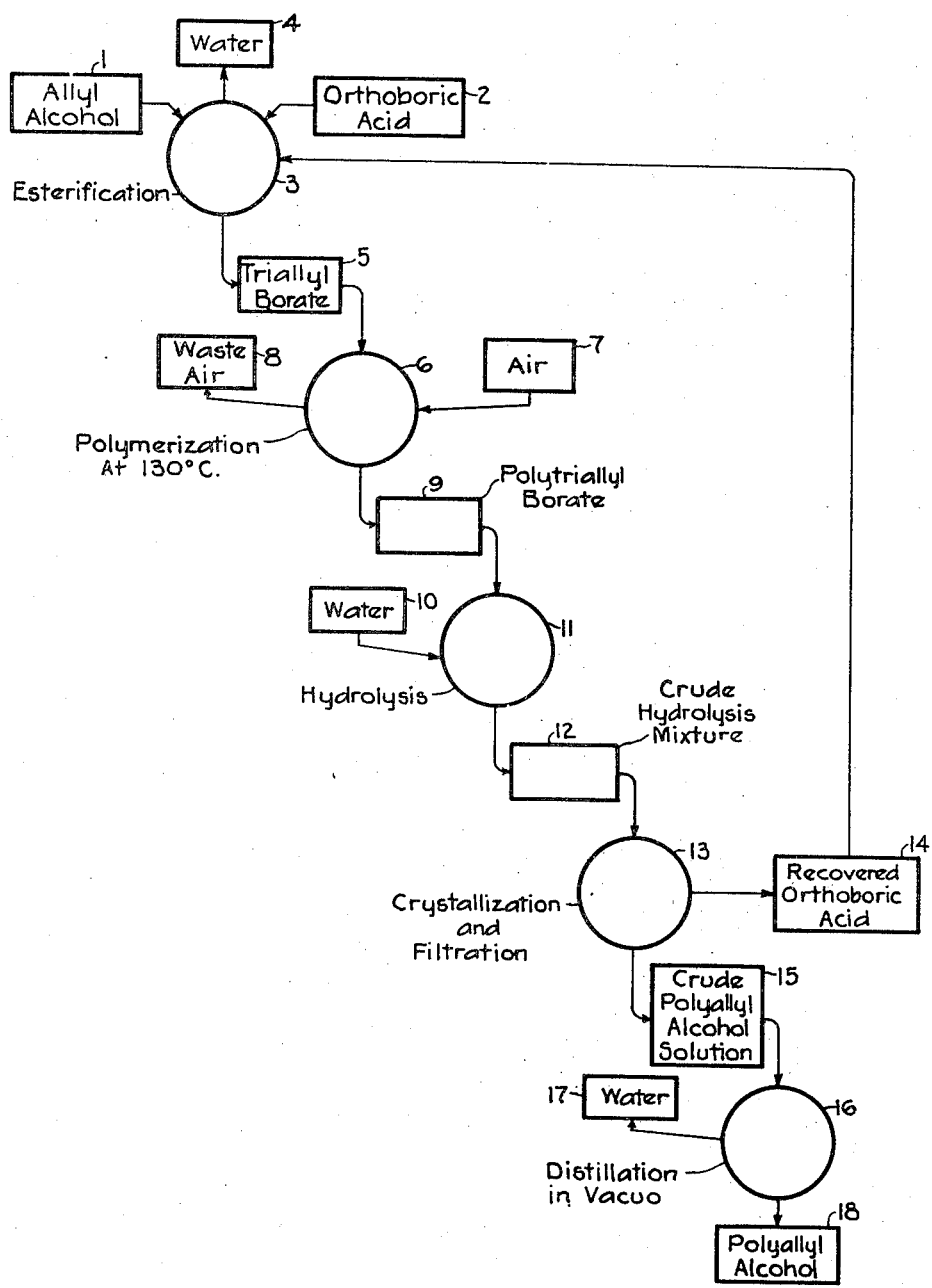

2,431,224

UNITED STATES PATENT OFFICE 2,431,224

PREPARATION OF POLYALLYL ALCOHOL

Seaver A. Ballard, Oakland, Calif., assignor to Shell Development Company, San Francisco, Calif., a corporation of Delaware Application January 29, 1944, Serial No. 520,338

6 Claims. (Cl. 260—80)

This invention relates to a method of obtaining polymers of beta,gamma-olefinic alcohols. More particularly, the invention pertains to a method for manufacturing polyallyl alcohol.

Polyallyl alcohol can be prepared by direct polymerization of allyl alcohol with the aid of peroxides or oxygen-containing gases as polymerization catalysts. This method is described and claimed in an application of Hans Dannenberg and David E. Adelson, Serial No. 420,388, filed November 25, 1941. This method is effective in polymerizing allyl alcohol, but it has certain disadvantages. The use of an oxygen-containing gas or peroxide compound as catalyst causes a certain amount of oxidation to occur so that the polyallyl alcohol obtained contains a small proportion of carboxylic acid, aldehyde and/or ester groups. These groups are present in the polymer molecules to a small extent owing to oxidation of the free hydroxyl group present in the allyl alcohol. The formation of these groups consumes oxygen and, while this is not particularly disadvantageous with the use of an oxygen-containing gas as catalyst, it is undesirable when peroxide catalysts are used since they consume or destroy the catalyst. Moreover, the presence of these various groups in the polymer is usually undesirable; it being preferred to have a polymer which contains the maximum number of hydroxyl groups per unit weight. It is a specific object of the present invention to provide a method whereby polyallyl alcohol containing a maximum number of hydroxyl groups per unit weight is obtained. A general object of the invention is to provide a method of obtaining polymers of beta,gamma-olefinic alcohols. Other objects will be apparent from the description of the invention given hereinafter.

These objects are realized according to the present invention by protecting the hydroxyl group or groups of the unsaturated alcohol during the polymerization operation and then hydrolyzing the formed polymer so as to obtain the desired polymeric alcohol. The hydroxyl group of the unsaturated alcohols is protected during the polymerization operation by using esters of the unsaturated alcohols with ortho acids of boron, silicon, aluminum, titanium, tin or germanium. The term ortho acid is used in this description of the invention in its general sense of meaning with respect to the metals. It refers to the highest hydrated form of the oxide of the metal, although the free acid of some of these metals may be unknown or incapable of existence as such. The preparation and polymerization of the allyl esters of ortho boric and ortho silicic acids are given in U. S. Patent 2,276,094, while the allyl esters of the inorganic ortho acids of titanium, aluminum and tin are described in U. S. Patent 2,258,718.

One of the principal features of the present invention consists of the method of preparing polymers of beta,gamma-olefinic alcohols which comprises the combination of steps of first polymerizing the unsaturated alcohol ester of the ortho acid of boron, silicon, aluminum, titanium, tin or germanium and then contacting or commingling the polymeric ester with water, preferably heated whereby the polymeric ester is hydrolyzed so as to release the desired polymeric alcohol. The alcohols which are obtained as polymers by the method of the invention are beta,gamma-olefinic alcohols of which allyl alcohol is a specific example. These compounds are a distinct class of unsaturated alcohols characterized in structure by having an olefinic double bonded linkage between the two carbon atoms which are in the beta and gamma position with respect to one carbinol group of the alcohol. The beta,gamma-olefinic alcohols may be either monohydric or polyhydric alcohols and the invention is primarily concerned with the former. These beta,gamma-olefinic monohydric alcohols have an olefinic linkage between two carbon atoms to one of which is linked directly the saturated carbon atom having the hydroxyl group of the alcohol linked directly to it. The unsaturated alcohols can be either primary, secondary or tertiary compounds. The monohydric unsaturated alcohols contain a characteristic structure which can be represented by the general formula

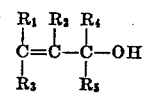

wherein $R_1$, $R_2$ and $R_3$ each represent a substituent such as a hydrogen atom, a halogen atom (fluorine, chlorine, bromine or iodine) or an organic radical, the organic radical preferably being a lower hydrocarbon radical like methyl, ethyl, propyl, butyl, isobutyl, pentyl, hexyl, vinyl, allyl, isobutenyl, phenyl, etc., and $R_4$ and $R_5$ are each a hydrogen atom or an organic radical which is also preferably a lower hydrocarbon radical. A preferred subclass of the beta,gamma-olefinic alcohols contains in the molecule a terminal methylene group attached by an olefinic double bond to a carbon atom which is directly attached to a saturated carbinol carbon atom as represented by the general formula

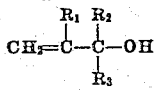

wherein each R represents a substituent such as a hydrogen atom or an organic radical, which is preferably a lower hydrocarbon radical, and $R_1$ may also be a halogen atom. Another preferred subclass of the unsaturated alcohols is that wherein the carbinol carbon atom is primary or secondary in character as represented by the formula

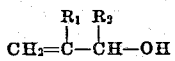

wherein each R represents hydrogen or a lower hydrocarbon radical and $R_1$ can also be a halogen. A most preferred subclass of the unsaturated alcohols is the 1-hydroxy-2-alkenes containing not more than 10 carbon atoms. These compounds are primary alcohols and may be straight-chain compounds, although this is not necessarily so.

Examples of beta,gamma-olefinic alcohols are allyl alcohol, methallyl alcohol, ethallyl alcohol, beta-chlorallyl alcohol, gamma-chlorallyl alcohol, 3-hydroxy-butene-1, 3-hydroxy-pentene-1, 3-hydroxy-isopentene-1, 3-hydroxy-3-methbutene-1, 3-hydroxy-2-methylpentene-1, 3-hydroxy-2-ethylbutene-1, 3-hydroxy-2,3-dimethylbutene-1, 3-hydroxy-pentadiene-1,4, and 3-hydroxy-hexene-1-yne-5. Other unsaturated alcohols of the class include crotyl alcohol, tiglyl alcohol, 3-chlorobutene-2-ol-1, cinnamyl alcohol, 1-hydroxy-hexadiene-2,4, 1-hydroxy-butadiene-2,3, 1-hydroxy-2-methylhexene-2, 2-cyclohexenol, 2-cyclopentenol, etc.

As explained hereinbefore, the term beta,gamma-olefinic alcohol includes within its scope dihydric as well as monohydric alcohols. Beta, gamma-olefinic dihydric alcohols have the olefinically unsaturated carbon atoms of the compound in the beta and gamma positions with respect to one of the carbinol groups or saturated carbon atom to which is directly linked the hydroxyl group, while the relationship with respect to the other carbinol group or hydroxyl substituted saturated carbon atom is not necessarily the same. Representative examples of specific beta,gamma-olefinic dihydric alcohols include 2-butene-1,4-diol, 2-pentene-1,4-diol, 2-pentene-1,5-diol, 2-chloro-2-butene-1,4-diol, 2-hexene-1,4-diol, 3-hexene-2,5-diol, 3-bromo-3-hexene-2,5-diol, 3-hexene-2,6-diol, 2-methyl-3-hexene-2,5-diol, 2-methyl-2-butene-1,4-diol, 1-phenyl-2-butene-1,4-diol, 2-benzyl-2-pentene-1,4-diol, 2-cyclohexyl-1,4-diol, 1-cyclohexyl-2-butene-1,4-diol, 3-cyclopentyl-2-pentene-1,5-diol, etc.

The unsaturated alcohol esters employed in the reaction are formed through reactions involving the hydroxyl group of the unsaturated alcohol and not the olefinic double bonds of the alcohol. Thus, the esters of the most preferred alcohol, allyl alcohol, with the ortho acids of the various metals are the compounds: triallyl borate, tetra-allyl silicate, triallyl aluminate, tetra-allyl titanate, tetra-allyl stannate, and tetra-allyl germanate.

The esters of the class of unsaturated alcohols with which the invention is concerned are the corresponding ester compounds of these ortho acids with the respective alcohols. Furthermore, the esters of the unsaturated diols are preferably as nearly completely esterified as possible while the esters of the monohydric alcohols are completely esterified compounds.

The monomeric unsaturated alcohol inorganic ortho acid esters are readily prepared from the unsaturated alcohol and methyl or ethyl inorganic ortho acid esters by means of an ester exchange reaction. The methyl or ethyl esters are commercially available or may be prepared by well-known methods from methyl or ethyl alcohol and the metal chlorides. In forming the desired unsaturated alcohol esters, the unsaturated alcohol is heated in admixture with methyl or ethyl inorganic ortho acid ester, preferably in the presence of sodium alcoholate as catalyst, and the methyl or ethyl alcohol evolved by the reaction is removed as distillate. In this manner, the unsaturated alcohol ortho acid esters of all the metals with which the invention is concerned, can be prepared.

The unsaturated alcohol ortho aluminates can be prepared, if desired, by a different method. A mixture of the unsaturated alcohol and toluene is heated with metallic aluminum, a small quantity of mercuric chloride being added to the reaction mixture to assist in starting the reaction. The mixture is heated until the reaction ceases whereupon the sludge which forms is filtered off and excess alcohol and toluene are removed as distillate under reduced pressure leaving as residue the desired unsaturated alcohol aluminate.

The unsaturated alcohol ortho borates are preferably prepared by a more direct method than the general method for the esters of the ortho acids. The ortho borate esters are prepared by esterifying the unsaturated alcohol with ortho boric acid. This is accomplished by heating the unsaturated alcohol with boric acid, preferably while having present an azeotrope-forming agent for water. The reaction mixture is heated in a still fitted with a column and the water of reaction is removed as an azeotrope with a substance like benzene, toluene, xylene, hexane, octane or similar inert azeotrope-forming material. The distillate is cooled and the azeotropic agent, which separates from the water of reaction, is returned as reflux to the column. The formed unsaturated alcohol ortho borate is purified by distillation which is preferably conducted under reduced pressure.

The unsaturated alcohol ortho acid esters are polymerized with the aid of either heat alone or heat in combination with a free oxygen containing gas. The polymerization of the compounds is effected with a liquid ester under the conditions of polymerization. Furthermore, the ester is polymerized with the ester as the sole polymerizable constituent present, since the desired end product is not an interpolymer of the unsaturated alcohol with some other polymerizable compound but rather the sole polymer of the unsaturated alcohol and this is realized only by polymerizing the unsaturated ester as sole polymerizable constituent. While the polymerization may be effected with a solution of the ester in an inert solvent like a non-olefinic hydrocarbon such as toluene, octane, etc., best results are obtained when the ester per se is employed. Owing to the ready hydrolysis of the monomeric esters when water is present, the polymerization is conducted under anhydrous conditions.

With the use of heat alone to effect formation of polymer of the ester, the choice of temperature depends principally upon the particular ester polymerized and the rate of polymerization desired. Increasing temperatures cause increased rates of polymerization, but the temperature in all cases is kept below that at which appreciable thermal decomposition of the polymer or monomer occurs. In general, a temperature of 100° C. to 250° C. is preferred. In all cases sufficient pressure is employed to maintain at least a portion of the ester in the liquid phase since it is the liquid ester which undergoes the desired polymerization reaction.

The use of free or molecular oxygen in combination with heat is effective in forming the desired polymer of the esters at an increased rate over the use of heat alone. The rate of polymerization is greater at a given temperature when an oxygen-containing gas is used to assist the reaction. For this purpose, a free oxygen-containing gas is employed which can be substantially pure oxygen or oxygen in admixture with other inert gas like nitrogen, hydrogen, methane, ethane, helium, etc. Ordinarily, the use of air is preferred in using the oxygen-containing gas. The gas is brought into intimate contact with the liquid ester or is intimately dispersed in the ester. It is usually preferred to pass the gas through the ester in the form of fine bubbles, although, if desired, the ester can be brought into intimate contact with it by flowing a thin film of the ester over a surface while having present an atmosphere of the gas. Since the ester finally sets up in the form of a gel or hard polymer, the method of bubbling the gas through a body of the ester is preferred. In the early stages of polymerization while the material remains liquid, the flow method can be used including allowing the liquid ester to flow downwards over packing material in countercurrent relation to the gas. The range of temperature at which the polymerization operation is conducted is preferably the same as in the case of thermal polymerization, namely, from 100° C. to 250° C. In no instance, however, is a temperature used which is at the ignition temperature of the ester.

The use of heat alone in forming the polymer permits the creation of polymer molecules by carbon-to-carbon bonding through the olefinic double bonds. When an oxygen-containing gas is employed as catalyst to assist the polymerization, part of the oxygen combines in forming the polymer. It appears that the polymer molecules are formed, at least in part, by oxygen bridges of an ethereal nature between monomer units. This is not undesirable because of the close similarity between the two polymers. The term polymer as used in this specification and the claims refers to both types of products.

The polymeric esters are hydrolyzed so as to liberate the polymeric alcohols by contacting the polymeric ester with water. The hydrolysis reaction causes the formation of the inorganic hydrolysis product which is either the ortho acid or a metal oxide depending upon the particular element present in the ortho acid portion of the polymeric ester. The hydrolysis operation is conducted by commingling or mixing the polymeric ester with water and preferably agitating the mixture until solution of the polymer is complete. In practice, as the polymeric ester goes into solution, the inorganic hydrolysis product usually precipitates from the reaction mixture. The amount of water employed in the hydrolysis operation will always be at least in sufficient amount to supply the water consumed in the hydrolysis reaction and, in general, a considerable excess over this amount is desirable. If the amount of water employed is too near this limit needed for the hydrolysis reaction, appreciable quantities of polymeric alcohol are occluded with the inorganic precipitate and this is undesirable. Although in general, the inorganic hydrolysis products have only very limited solubilities in the reaction mixture (that of boric acid being greatest), very large excesses of water are to be avoided and this is especially true in the case of hydrolysis in the polymeric borates. In general, the use of from 0.5 to 4 volumes of water per volume of polymeric ester is desirable and from 0.75 to 2 volumes of water per volume of polymeric ester is most preferable. The temperature of the hydrolysis operation is preferably conducted at between 50° C. and the boiling temperature of the reaction mixture, although lower temperatures such as atmospheric temperature can be used if desired. The boiling temperature of the reaction mixture is suitable for obtaining the most rapid hydrolysis. A convenient way of supplying the heat for the hydrolysis mixture is to transfer the hot polymer directly from the polymerization operation without cooling into the water which is at ordinary temperature. Of course, external heating may be used if desired. The inorganic hydrolysis product is separated from the reaction mixture and is usually recovered. This separation is accomplished preferably by filtration of the precipitated inorganic hydrolysis product from the reaction mixture although other methods such as centrifugation or decantation can be used if desired. In effecting the separation, it is preferred to cool the reaction mixture to a temperature between 0° C. and 20° C. in order to precipitate more completely the inorganic hydrolysis product. The desired polymeric alcohol is obtained from the resulting reaction mixture which is substantially freed of the inorganic hydrolysis product by separating the water and any other volatile materials therein. The water and any other volatile materials are separated by evaporation or distillation so as to leave the desired polymeric alcohol, which is substantially non-volatile, as residue. Since the polymeric alcohols are in general quite hygroscopic, the water is preferably removed under reduced pressure or vacuum. The final water can be dried from the polymer by passing dry gas or even dry air therethrough at ordinary temperature.

The esters of ortho boric acid are preferred for use in the invention since they afford a particularly advantageous manner of attaining the objects of the invention owing to properties of the esters of ortho boric acid. These desirable properties include the ease with which the polymer of the ester of a beta,gamma-olefinic alcohol with ortho boric acid can be hydrolyzed upon contact or commingling with the water; the facts that the inorganic hydrolysis product is the free acid, ortho boric acid, and that it can be recovered as such from the reaction mixture; and the further fact that the ortho boric acid can be esterified directly with the unsaturated alcohol to form the monomeric unsaturated alcohol ortho borate ester. The properties provide means for a cyclic process which is especially suitable for use as a commercial method for manufacturing polymer of beta,gamma-olefinic alcohols. According to the invention, the method comprises the combination of steps of (1) esterifying a beta,gamma-olefinic alcohol with ortho boric acid, (2) polymerizing the formed unsaturated ester to polymer, (3) commingling or mixing the polymer with sufficient water to effect hydrolysis and liberate ortho boric acid, (4) separating the liberated boric acid from the reaction mixture, (5) recovering and purifying the polymeric alcohol from the reaction mixture, and (6) recycling the separated ortho boric acid to esterification step (1) for re-esterification with additional unsaturated alcohol. By this method the desired polymer of the unsaturated alcohol is obtained and the boric acid which is used to protect the hydroxyl group or groups of the alcohol can be recovered as such and directly reused repeatedly in the process except for minor losses which inevitably may occur in the operation.

The cyclic method of the invention is illustrated by a flow diagram in the accompanying drawing. For convenience the method of production of polyallyl alcohol is shown in the diagram although the general principles there illustrated are applicable to production of polymer from the class of unsaturated alcohols with which the invention is concerned.

Referring to the flow diagram, allyl alcohol 1 and ortho boric acid 2 are combined and subjected to esterification 3. The water 4 formed by the reaction is removed so as to produce triallyl borate 5. The triallyl borate 5 is then subjected to polymerization 6 at a temperature of about 130° C. while intimately dispersing air 7 through the reaction mass and waste air 8 is discharged from the polymerization operation. While the use of air 7 is shown, the polymerization may be effected thermally, if desired, i. e. the presence of air or other oxygen-containing gas being excluded. The polymerization operation 6 produces polytriallyl borate 9 which is commingled with water 10 and the polytriallyl borate 9 is subjected to hydrolysis 11 preferably at 50° C. to 100° C. which is conveniently realized by using hot polymer, without cooling, from the polymerization step. The hydrolysis operation 11 is continued with agitation of the mixture whereby hydrolysis of the polymer is effected. The hydrolysis operation produces a crude hydrolysis mixture 12 which contains water, polyallyl alcohol and boric acid. The crude hydrolysis mixture 12 is next subjected to crystallization and filtration 13 for separation and removal therefrom of ortho boric acid 14. The separation of the boric acid 14 from the crude hydrolysis mixture 12 is preferably handled in two operations. The hot or partly cooled crude hydrolysis mixture is filtered for first removal of crystallized boric acid. The filtrate is then cooled to a temperature of 0° C. to 10° C. so as to crystallize additional boric acid which is also filtrated from the reaction mixture. The crude polyallyl alcohol solution 15, obtained in this manner, is then subjected to distillation in vacuo 16 whereby the water 17 of the solution is removed, leaving the desired polyallyl alcohol 18. The ortho boric acid 14 recovered in crystallization and filtration operation 13 is recycled to esterification step 3. After the initial material requirements are filled, so as to get the cyclic method into operation, the ortho boric acid 2 merely supplies the acid lost in the process.

Since boric acid has an appreciable solubility in aqueous solutions, even at temperatures below ordinary room or atmospheric temperature, some boric acid will remain after the crystallization and filtration operation and this acid will be carried along with the polymeric boric alcohol so as to remain in the final product unless some means are used to remove it. The amount of boric acid remaining is very small, but its presence in the polymeric alcohol is usually undesirable. The residual boric acid can be removed by steaming, although this method is slow. Steaming at temperatures above 100° C., preferably between 150° C. and 200° C., is most effective, since the amount of boric acid present in the overhead steam increases with increasing temperature. A more rapid method of removing the residual boric acid, is to substitute methyl or ethyl alcohol vapor for steam. In this operation the methyl or ethyl alcohol combines with the residual boric acid to form volatile methyl or ethyl borate. The methyl or ethyl alcohol is passed into or admixed with the polymeric alcohol and a mixture of methyl or ethyl alcohol with the corresponding borate esters is removed with substantially no fractionation. This distillate is passed into a vessel containing aqueous caustic which decomposes the boric ester and from which the methyl or ethyl alcohol is distilled for recycling to the polymeric alcohol. By this method, the polymeric alcohol is readily freed of boric acid so that a negative flame test of the polymer for boron is obtained.

The polymeric alcohol produced by the method of this invention is colored to a greater or lesser extent. The product can be decolorized by catalytic hydrogenation as described and claimed in the copending application of David E. Adelson and Harold F. Gray, Jr., Serial No. 502,372, filed September 14, 1943.

The polymers of the beta, gamma-olefinic alcohols obtained by the process of this invention are very useful materials. They are valuable for textile treating; alkyd resins may be prepared from them; they may be nitrated to form explosives; drying oils may be prepared from them by reaction with drying oil acids; and they may be acetalized to give resinous materials. The polymers from beta, gamma-olefinic primary alcohols of which the 1-hydroxy-2-alkenes containing not more than 10 carbon atoms are a preferred subclass are particularly desirable since such polymers have all of the hydroxyl groups present in the polymer molecules in the form of primary alcoholic groups. This structure is especially suitable when the polymeric alcohols are used to prepare derivatives.

The following examples illustrate in detail some features of the invention. The examples are given for illustrative purposes only and the invention is not to be construed as limited to operative details given therein.

*Example I*

A mixture of 393 g. (6.36 moles) boric acid, 1450 g. (25 moles) allyl alcohol and 75 cc. benzene was refluxed under a short column bearing a phase separating head until no more water separated as lower layer in the overhead. Excess allyl alcohol and benzene were distilled off. The residual material, which was crude triallyl borate, was then distilled at atmospheric pressure; 1051 g. (5.77 moles) triallyl borate $b_{760}$ 180.6–181.4° C., $n_D^{20}$ 1.4278, was collected. The yield was 91% on boric acid and 90% on allyl alcohol. The undistillable bottoms, which accounted for both losses, appeared to be largely polymer.

The triallyl borate was a colorless, mobile liquid which was easily hydrolyzed by water and accordingly was very sensitive to moisture. If water was not scrupulously excluded from triallyl borate, the latter deposited a white solid (boric acid) and developed the odor of allyl alcohol.

Example II

A mixture of 456.5 g. (7.38 moles) boric acid, 2016 g. (28 moles) methallyl alcohol and 150 cc. benzene was refluxed as above until water evolution ceased. Benzene and excess methallyl alcohol were distilled off and the residue fractionated under reduced pressure. This yielded 1418.4 g. of pure trimethallyl borate, B. P. 119° C. to 121° C. at 18 to 20 mm. (86% yield on boric acid). Trimethallyl borate was a white, crystalline solid which analyzed as follows:

|  | Found | Calcd. for $C_{12}H_{21}O_3B$ |
|---|---|---|
| Per cent Carbon | 64.3 | 64.28 |
| Per cent Hydrogen | 9.5 | 9.42 |
| Apparent Molecular Weight (Cryo. $C_6H_6$) | 210 | 224 |
| Saponification Value, Calcd. as Trimethallyl Borate per cent | 98.7 | 100 |
| Melting Point (Cooling Curve Method) °C | 28.6 | |
| Bromine Number g. $Br_2$/100 g | 235 | 214 |

Example III

A mixture of 61.9 g. boric acid (1 mole or 3 equiv.), 145 g. 2-butene-1,4-diol (1.5 mole or 3 equiv.+10% excess) and 100 cc. benzene was heated under a phase separating head as described above. The boric acid and 2-butene-1,4-diol formed a lower layer under the benzene. Water was evolved at a fairly rapid rate and removed overhead azeotropically. The boric acid crystals gradually disappeared and a very viscous yellow oil appeared in its place as lower layer. Gelling began at this point. Toward the end of the esterification reaction the boric ester and the benzene began to homogenize and gelling became more pronounced. The final product was a yellow gel. The total amount of water collected was 47 cc., indicating at least 87% reaction.

Example IV

A sample of trimethallyl borate (10 g.) was treated at 125° C. to 130° C. with a stream of air at the rate of 5 bubbles per second for 93 hours. The initial material was a white, crystalline solid at room temperature. The final product was a viscous yellow liquid.

Example V

Triallyl borate (481 g., 2.64 moles) was treated with 34.7 cu. ft. of air in the form of a slow stream at 130° C., until a refractive index of 1.467(4) had been attained. (The monomer was contained in a reactor fitted with a condenser and the latter was connected to a cold trap cooled in a mixture of dry ice and acetone.) At this point the air flow became erratic because the material become lumpy and gelatinous. The materials balance was:

|  | Grams |
|---|---|
| Polytriallyl borate | 409 |
| Cold trap condensate | 99 |
| Total | 508 |
| Initial triallyl borate | 481 |
| Gain in weight of system | 27 |

Hydrolysis of the polytriallyl borate was effected by warming with 1 liter of water followed by cooling the resulting suspension of boric acid in the aqueous solution of polyallyl alcohol to about 30° C. The boric acid was filtered off (recovery, 87%) and the aqueous solution was subsequently evaporated to yield polyallyl alcohol which represented 50.9% of the total polyallyl alcohol and monomeric allyl alcohol recovered. The crude polymer analyzed as follows:

Percent carbon ____ 54.1
Percent hydrogen __ 9.2
Acetyl value _____ 1.72 equiv./100 g.
Acidity _____ 0.011 equiv./100 g.
Saponification value 0.059 equiv./100 g.
Carbonyl value ____ 0.01(2) moles —CO—/100 g.
Percent boron (calcd. from acidity)____ 0.11

These data indicate that the polyallyl alcohol is an oxy-condensation polymer of allyl alcohol.

The boron was removed from the polymer as trimethyl borate by distilling with methyl alcohol. At 75° C. to 80° C. the percentage of boron in the distillate, calculated as boric acid, was 0.9; the polymer thus treated contained less than 0.005% boric acid.

Example VI

Triallyl borate was polymerized by bubbling a slow stream of air through it at about 130° C. The polymerization was continued until the material gelled. The hot polytriallyl borate was then transferred, without cooling, directly into water for hydrolysis and the mixture was agitated with kneading of the polymer until it dissolved. The boric acid was filtered off and the crude polyallyl alcohol was distilled in vacuo followed by treatment with methyl alcohol to remove residual boric acid. The technique of the operation was essentially the same as that described in Example V. The pertinent data are summarized in the table below:

| | |
|---|---|
| Triallyl borate charged_____grams__ | 2265 |
| Total air used_____cubic feet__ | 0.62 |
| Cold tray recovery from air stream grams__ | 41 |
| Time to gel point (end of polymerization) days__ | 24 |
| $n_D^{20}$ at gel point | 1.461 |
| Color of polytriallyl borate | Pale yellow |
| Polytriallyl borate recovered_____grams__ | 2260 |
| Gain in wt. of system ($O_2$ absorption) grams__ | 36 |
| Water used in hydrolyzing_____liters__ | 2.5 |
| Boric acid recovery by filtration___grams__ | 719 |
| Boric acid recovery by methyl alcohol treatment _____grams__ | 57 |
| Total boric acid recovery_____do____ | 776 |
| Total boric acid in triallyl borate charged _____grams__ | 769 |
| Polyallyl alcohol produced_____do____ | 751 |
| Color of polyallyl alcohol_____ | Light brown |

Example VII

A sample of crude polyallyl alcohol was prepared as described in the above examples. It was dark brown in color. The crude polymer was dissolved in enough water to make a 25% solution and the latter was made strongly alkaline by means of barium hydroxide. The resulting solution was transferred to a steel bomb and hydrogenated over Raney nickel catalyst for 16 hours at 160° C. and 1510 lb. per sq. in. hydrogen pressure; 0.0058 mole of hydrogen were absorbed per gram of active material. After cooling the bomb to room temperature and releasing the pressure, the bomb was opened and its contents filtered. The resulting solution had a slight yellow tint.

Upon re-running the hydrogenation under the same conditions as above, 0.0010 mole of hydrogen were absorbed per gram of active material and a colorless solution was obtained which yielded upon evaporation a colorless polyallyl alcohol.

The second hydrogenation was subsequently avoided by application of the following procedure: An aqueous solution of crude polyallyl alcohol was refluxed for one hour over Raney nickel in order to remove catalyst poisons. The color of the solution was unchanged. The solution was charged with fresh Raney nickel catalyst and hydrogenated for 16 hours at 160° C. and 1520 lb. per sq. in. hydrogen pressure; 0.0035 mole of hydrogen was absorbed per gram of active material. The resulting solution and polyallyl alcohol obtained therefrom were practically colorless.

I claim as my invention:

1. A process for the production of a polymer of a beta, gamma-olefinic alcohol comprising hydrolyzing a sole polymer of an ester of a beta, gamma-olefinic alcohol with an ortho acid of an element selected from the class consisting of boron, silicon, aluminum, titanium, tin and germanium, said hydrolysis being achieved by commingling the said polymerized ester with water as the sole hydrolyzing agent, the quantity of water and the contact time being sufficient to substantially completely hydrolyze said polymerized ester.

2. The process of claim 1 wherein the polymerized ester is hydrolyzed by water at a temperature of between 50° C. and 100° C.

3. The process of claim 1 wherein the hydrolysis is conducted with from 0.5 to 5 volumes of water per volume of ester.

4. The process of claim 1 wherein the polymer of the alcohol is separated from the other products of hydrolysis by filtration.

5. A process for the production of a polymer of a 1-hydroxyalkene-2 containing not more than 10 carbon atoms, which comprises hydrolyzing, as sole constituent, a sole polymer of an ortho borate ester of said hydroxyalkene with from 0.5 to 4 volumes of water per volume of polymerized ester, said water constituting the sole hydrolyzing agent, at a temperature between 50° C. and 100° C.

6. A process for the production of polyallyl alcohol which comprises commingling a sole polymer of triallyl ortho borate with water as sole hydrolyzing constituent, the quantity of water and the contact time being sufficient to substantially completely hydrolyze said triallyl ortho borate.

SEAVER A. BALLARD.

REFERENCES CITED

The following references are of record in the file of this patent:

UNITED STATES PATENTS

| Number | Name | Date |
|---|---|---|
| 2,332,900 | D'Alelio | Oct. 26, 1943 |
| 2,258,718 | Rothrock (1) | Oct. 14, 1941 |
| 2,276,094 | Rothrock (2) | Mar. 10, 1942 |
| 2,332,460 | Muskat et al. (1) | Oct. 19, 1943 |
| 2,318,959 | Muskat et al. (2) | May 11, 1943 |